United States Patent [19]
Wallace et al.

[11] Patent Number: 5,649,719
[45] Date of Patent: Jul. 22, 1997

[54] LINKAGE SUSPENSION SYSTEM

[75] Inventors: Gareth A. Wallace, Palos Heights; Tjong T. Lie, Naperville, both of Ill.; Michael J. Keeler, Canton, Ohio; Michael Gottshalk, New Philadelphia, Ohio; John Ramsey, Canton, Ohio; Allen Hatch, Chicago, Ill.; Richard S. Holum, Westmont, Ill.; Charles A. Van Breemen, Glen Ellyn, Ill.

[73] Assignee: The Boler Company., Itasca, Ill.

[21] Appl. No.: 606,058

[22] Filed: Feb. 23, 1996

[51] Int. Cl.$^6$ ............................................. B60G 11/26
[52] U.S. Cl. ................................. 280/713; 180/352
[58] Field of Search .......................... 280/688, 678, 280/683, 685, 711, 713; 180/352

[56] References Cited

U.S. PATENT DOCUMENTS

| | | | |
|---|---|---|---|
| Re. 33,630 | 7/1991 | Griffin | 280/689 |
| 2,180,860 | 11/1939 | Brown | 267/64.23 |
| 2,323,007 | 6/1943 | Borgward | 180/352 |
| 2,814,480 | 11/1957 | Clark et al. | 267/256 |
| 2,881,799 | 4/1959 | Menewisch | 137/596.15 |
| 2,994,396 | 8/1961 | Bidwell | 180/435 |
| 3,231,040 | 1/1966 | Blanchette | 180/352 |
| 3,406,983 | 10/1968 | Masser | 280/713 |
| 3,768,829 | 10/1973 | Colovas et al. | 180/352 |
| 3,801,086 | 4/1974 | Raidel | 267/226 |
| 4,146,104 | 3/1979 | Leembruggen | 180/65.6 |
| 4,262,929 | 4/1981 | Pierce | 280/713 |
| 4,309,045 | 1/1982 | Raidel | 280/711 |
| 4,379,572 | 4/1983 | Hedenberg | 280/711 |
| 4,410,201 | 10/1983 | Iijima et al. | 280/688 |
| 4,722,549 | 2/1988 | Raidel | 280/711 |
| 4,756,550 | 7/1988 | Raidel | 280/713 |
| 4,900,057 | 2/1990 | Raidel | 280/713 |
| 5,203,585 | 4/1993 | Pierce | 280/713 |
| 5,366,035 | 11/1994 | Hayashida et al. | 180/352 |
| 5,366,237 | 11/1994 | Dilling et al. | 280/711 |
| 5,368,322 | 11/1994 | Korpimaa | 280/709 |
| 5,375,871 | 12/1994 | Mitchell et al. | 280/688 |
| 5,458,359 | 10/1995 | Brandt | 280/673 |

OTHER PUBLICATIONS

Truckstell Manufacturing Company brochure—Trojan independent air suspension, 1960's.
Chalmers Suspensions International brochure—Loadguard rubber spring suspension, date unknown.

*Primary Examiner*—Kenneth R. Rice
*Attorney, Agent, or Firm*—Lockwood, Alex Fitzgibbon & Cummings

[57] ABSTRACT

A vehicle suspension system particularly useful in the heavy duty truck and trailer industry is disclosed. The suspension features lower control rods that are pivotally connected at their leading ends to hangers attached to each side frame member. The rearward ends of the lower control rods are attached to axle seats, one at each end of the axle, which are connected to the axle of the vehicle. Air springs and shock absorbers or, alternatively, hydraulic cylinders with accumulators, are mounted between each axle seat and each side frame member. The lower control rods are in an inclined orientation with their forward ends above their trailing ends. Additionally, some embodiments of the suspension feature upper control rods with their forward ends pivotally attached to the two opposing truck side frame members. The rearward ends of the upper control rods are attached to the top center of the axle by either a bolt and bushing mount or a ball and socket mount so that the upper control rods form a "V". The upper control rods lay in a nearly horizontal plane. As an alternative to the "V" configuration of the upper control rods, a single, nearly horizontal, longitudinal upper control rod mounted between the centers of the frame cross member and the vehicle axle may be used in conjunction with either a control rod or a Watt linkage transverse to the side frame members. The suspension eliminates the heavy and costly Z-springs commonly used in air or hydraulic suspensions. The suspension has a lower frequency and is not torque reactive. Both of these features reduce vibration and provide for a better vehicle ride. The suspension also offers improved vehicle traction.

17 Claims, 8 Drawing Sheets

5,649,719

LINKAGE SUSPENSION SYSTEM

BACKGROUND OF THE INVENTION

1. Field of the Invention

The present invention relates to suspension systems for wheeled motor vehicles and, more specifically to a suspension system incorporating new and improved control rod linkage configurations.

2. Discussion

The present invention finds particular utility in the heavy duty truck and trailer industry. In this industry, the use of air suspension systems has become quite popular due to their softer ride characteristics. In these suspensions, equivalents of air springs, such as hydraulic cylinders with accumulators, are sometimes alternatively used. Air suspension systems in common use typically utilize trailing arms, also called main support members, that are rigidly attached to the vehicle axles to support the vehicle frames upon the vehicle wheels. The trailing arms are pivotally attached at one end to the vehicle frames with air springs mounted between the frames and the other end of the trailing arms.

The trailing arms may take the form of gooseneck shaped Z-springs. U.S. Pat. Nos. 4,693,486, 3,547,215, 4,858,949 and 5,346,247 provide examples of such trailing arm suspensions. Alternatively, in some common designs, the trailing arm may take the form of a straight leaf spring.

Z-springs add a significant amount of weight to trailing arm air suspensions. The Z-springs typically weigh around 60 lbs. each. Additionally, the relatively large amount of material that goes into manufacturing the Z-springs is costly and the size of the Z-springs take up a substantial amount of space underneath the vehicle. Use of Z-springs may also require the use of additional associated components which adds even more weight.

The suspension frequency of a suspension system has an impact upon the ride quality of the truck. A suspension with a high suspension frequency is by its nature more rigid and thus transmits to the frame inputs such as road irregularities. The high rigidity of such a suspension also means that the motion of the suspension components in response to inputs is minimal. Movement of the suspension components isolates the energy resulting from the road inputs. The more the suspension components move in reaction to an input, the more energy is isolated or dissipated. The excess energy that the high frequency suspension doesn't isolate or dissipate is transmitted to the truck body and shows up as vibration and a rough ride quality. In contrast, a lower frequency suspension has components that move more freely when subjected to inputs. This isolates or dissipates more energy and thus produces less vibration and a smoother ride.

Trailing arm suspensions, such as the one shown in FIG. 1, are torque reactive. Due to the uses of higher horsepower engines and advances in engine technology, there have been increases in the torque output of heavy duty truck engines. Such increases have exacerbated the problems of driveline vibration and wheel hop associated with the torque reactive trailing arm suspensions. When increased torque is applied to the drive train of a truck equipped with such a torque reactive suspension, such as during acceleration, the frame of the truck rises up and away from the drive axle. This condition is known in the art as "frame rise" and results in the driveline vibration and wheel hop.

Trailing arm suspensions clamped rigidly to the axle tend to twist the axle housing in reaction to road surface irregularities encountered on one side of the vehicle during operation. This axle twist tends to lift the tires on the opposite side of the vehicle off of the ground, sometimes to the point where traction is lost.

Axle twist is also detrimental to the fatigue life of the axle. As a result, several truck and trailer manufacturers require heavier axle wall housings for use with trailing arm air suspensions which increases the axle weight.

It is therefore an object of the present invention to provide an air or hydraulic suspension system that saves weight and space and reduces cost through the elimination of Z-springs and similar trailing arms and associated components.

Another object of the present invention is to provide an air or hydraulic suspension that has a low suspension frequency.

Yet another object of the invention is to provide a suspension that maintains greater tire traction when road surface irregularities are encountered.

Yet another object of the invention is to improve the axle connection and thus enhance axle fatigue life.

SUMMARY OF THE INVENTION

The present invention is directed to a suspension system for supporting a vehicle chassis on an axle. In some embodiments, each side of the vehicle suspension features the following. A hanger is attached to a chassis side frame member. An axle seat is attached to the axle. A lower control rod is pivotally connected at its forward end to the hanger and at its rearward end to the axle seat so that the lower control rod is inclined with its forward end appreciably above its rearward end. A bracket for attaching the upper control rod to the frame is also attached to the chassis side frame member. An axle mount is attached to the top of the axle midway between the ends of the axle. An upper control rod is pivotally connected at its forward end to the bracket and at its rearward end to the axle mount so as to lay in an approximately horizontal plane. The lower control rod and upper control rod are vertically appreciably closer together at their forward ends than at their rearward ends. Spring means, such as an air spring, a hydraulic cylinder with accumulator, an elastomeric spring or a mechanical spring, is mounted between the axle seat and the chassis frame member.

In alternative embodiments, the pair of upper control rods are replaced by a single longitudinal upper control rod combined with either a single transverse upper control rod or a transverse Watt linkage. In both embodiments, the longitudinal upper control rods lay in an approximately horizontal plane so that they and the lower control rods are vertically appreciably closer together at their forward ends than at their rearward ends.

For a more complete understanding of the nature and scope of the invention, reference may now be had to the following detailed description of embodiments thereof taken in conjunction with the appended claims and accompanying drawings.

DESCRIPTION OF THE PREFERRED EMBODIMENTS

Figure 1:
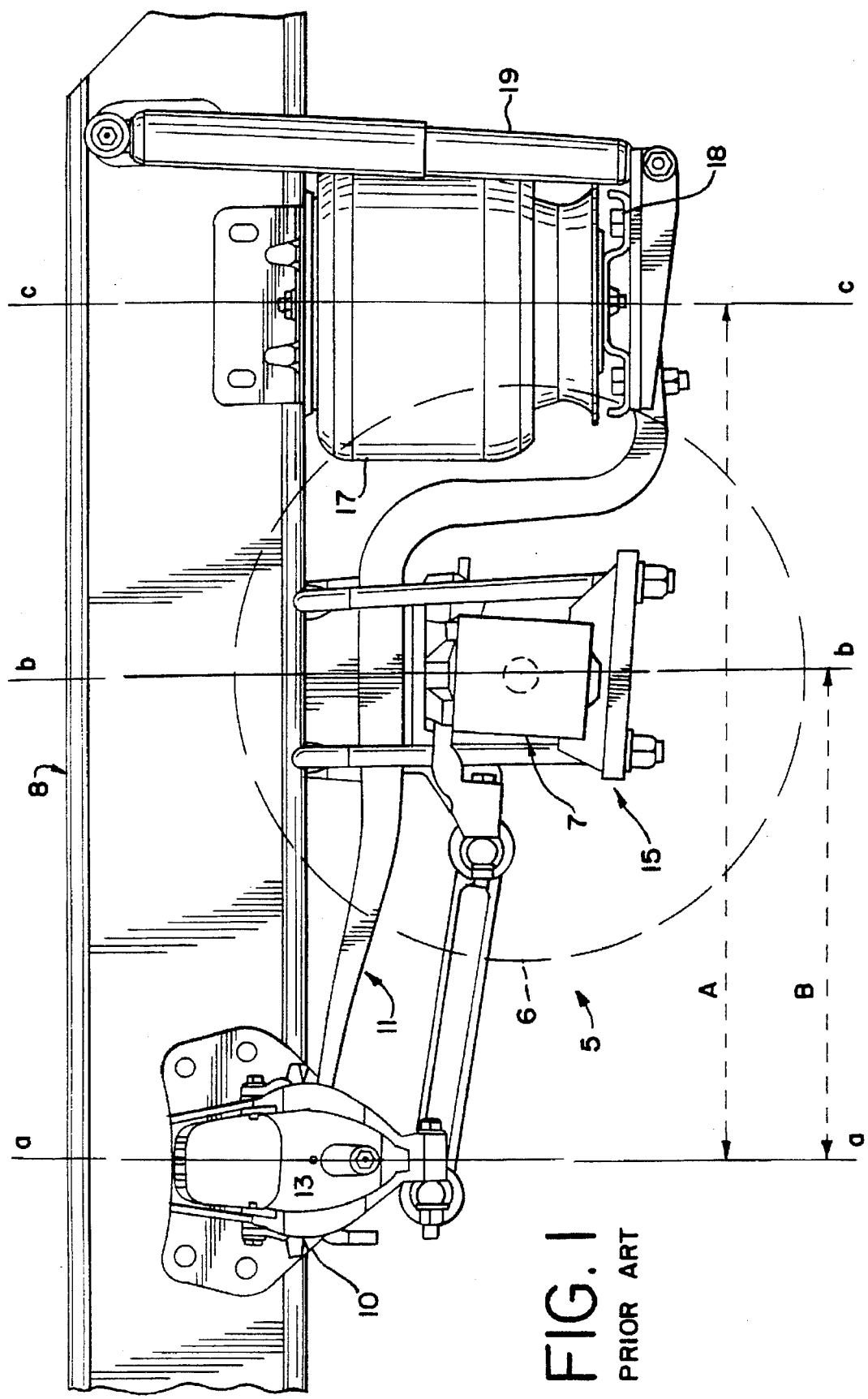
FIG. 1 is a side elevational view of a prior art trailing arm torque reactive heavy duty truck suspension.

Referring to FIG. 1, a typical trailing arm torque reactive suspension is indicated generally at 5 which supports the rear of a vehicle, such as a heavy duty truck on ground wheels indicated generally at 6 mounted on opposite ends of a drive axle indicated generally at 7. As used herein "drive axle" designates both the drive axle proper and the drive axle housing. The components of the suspension 5 on opposite sides of the vehicle are the same. The frame or chassis of the vehicle is represented by the fore-and-aft side frame members 8.

Mounting bracket 10 is suitably mounted on the outer side of the side frame member 8 so as to receive and support the front end of the Z-spring 11 so that Z-spring 11 generally pivots about point 13. The Z-spring 11 is mounted to the drive axle by means of a conventional axle attachment assembly indicated generally at 15. An air spring 17 is bolted at its bottom end to the cross channel 18 and that to the trailing end of Z-spring 11 and at its top end to side frame member 8. Shock absorber 19 is similarly connected between the Z-spring trailing end and the side frame member 8. Vertical line a—a intersects pivot point 13 while vertical lines b—b and c—c intersect the axle 7 and air spring 21, respectively. The vehicle chassis, as represented by side frame member 8 is resiliently supported on drive axle 7 and the ground wheel 6 by the Z-spring 11 coacting with the bracket 10, air spring 17 and shock absorber 21.

The suspension frequency of a trailing arm air suspension is calculated as follows:

$$\text{Suspension Frequency} = \sqrt{\text{Linkage Ratio}} \times \text{Air Spring Frequency}$$

In this equation, the Linkage Ratio=A/B, where, referring to FIG. 1:

A=the horizontal distance between the suspension pivot point 13 and the air spring 17, that is, the horizontal distance between line a—a and line c—c, and B=the horizontal distance between the suspension pivot point 13 and the axle 7, that is, the horizontal distance between line a—a and line b—b.

Note that the same equation could be used for a suspension that utilized alternative spring members in place of the air springs.

A typical value for the air spring frequency is 1.2 cycles/second (Hz), while a typical value for the linkage ratio is 1.76. It follows, given the equation above, that a lower linkage ratio would result in a lower suspension frequency. A general practice in the automotive industry has been to strive for a suspension frequency of about 1.0 Hz. Previous suspension geometries, such as the one shown in FIG. 1, were inhibited from approaching this goal by their linkage ratio. Additionally, with such suspensions, the flexibility of the Z-springs further increases suspension frequency.

To achieve a linkage ratio closer to 1.0 with the suspension of FIG. 1, it would be necessary to shift pivot point 13 a horizontal distance away from axle 7 and air spring 21. This would require increasing the length of Z-spring 11 which would increase its weight and cost. Additionally, the extended Z-spring would take up more space and the length of its extension would be limited by other undercarriage components such as the front suspension and fuel tank mounting.

Figure 2:
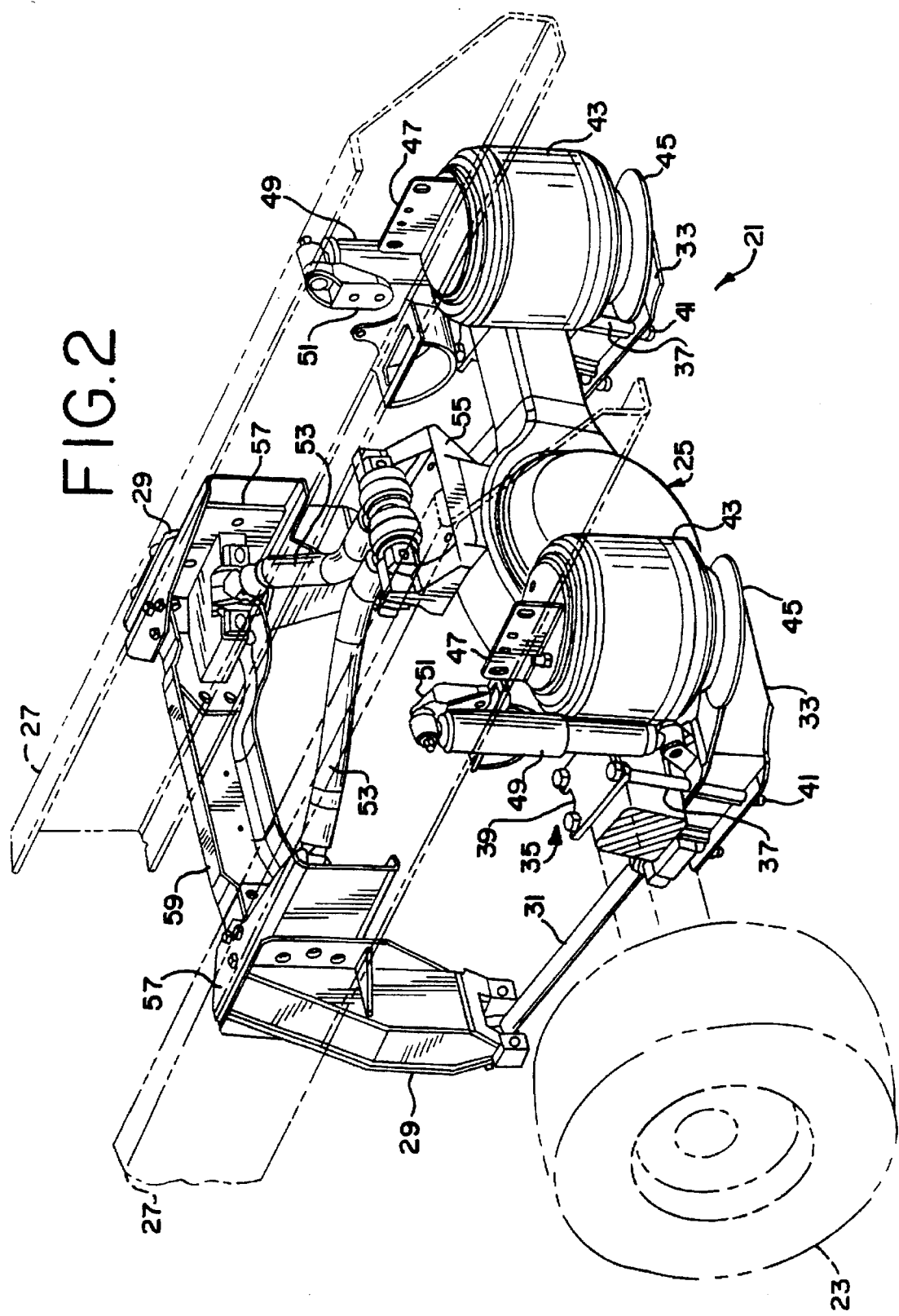
FIG. 2 is an isometric view of an embodiment of the suspension of the present invention utilizing air springs and a bolt and bushing assembly upper axle mount.

Referring now to FIG. 2, an embodiment of the suspension of the present invention is indicated generally at 21. The suspension supports a vehicle, such as a heavy duty truck, on ground wheels indicated generally at 23 mounted on the ends of a drive axle indicated generally at 25. The components of the suspension 21 on opposite sides of the vehicle are the same. The frame of the vehicle is represented by the fore-and-aft side frame members 27. Note that the suspension of FIG. 2 features upper and lower pivot points at the axle. In addition to providing cost and weight savings by allowing elimination of the Z-spring, this arrangement makes the suspension of FIG. 2 not reactive to torque. The arrangement also allows the suspension displacement caused by the encounter of a surface bump by one tire to be more independent of the opposite side of the suspension. This reduces the amount of axle twist which improves traction of the tire on the opposite side of the suspension.

Figure 4:
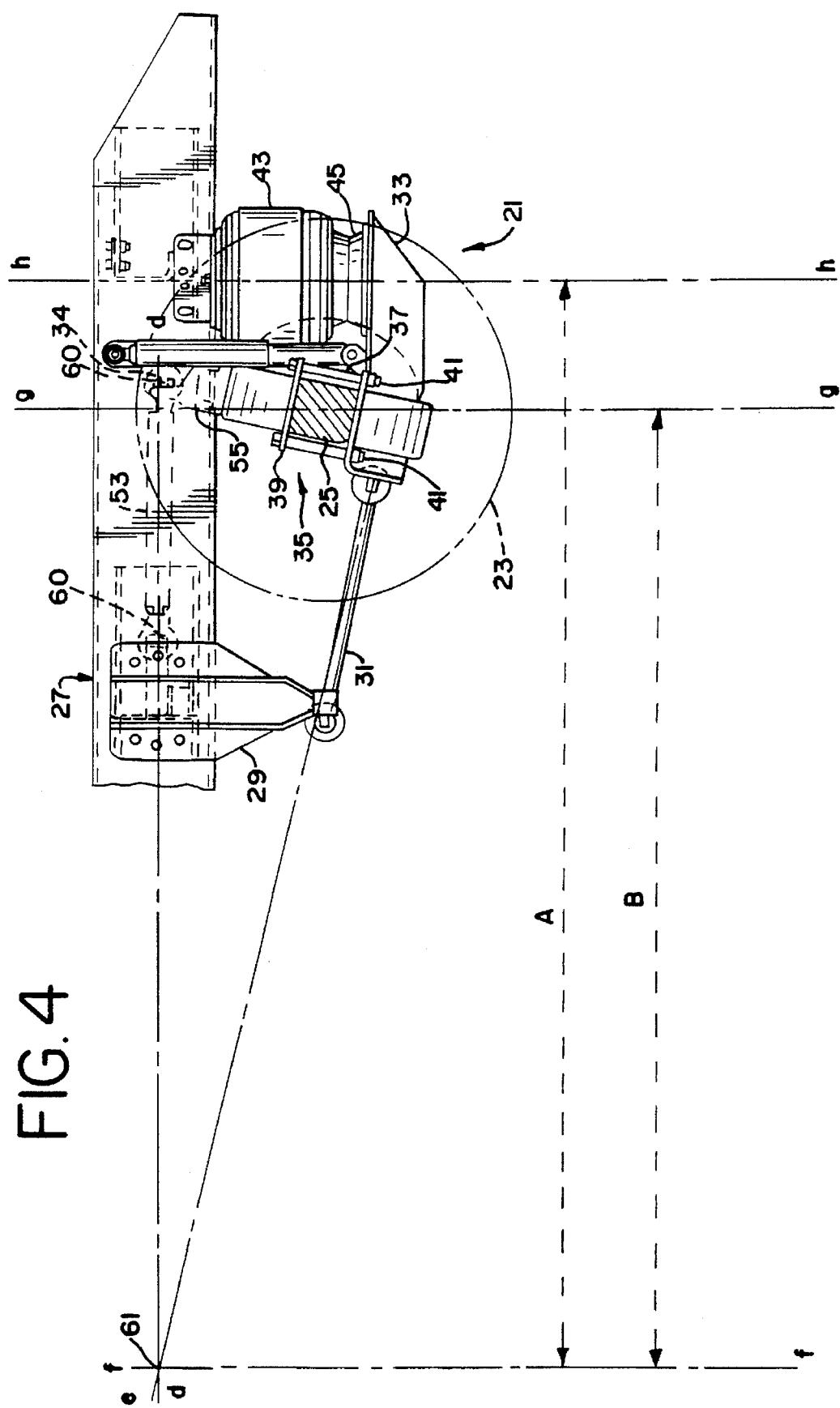
FIG. 4 is a side elevational view of the suspension of FIG. 2.

Hangers 29 are suitably mounted on the outer sides of the side frame members 27 so as to pivotally connect with the forward ends of lower control rods 31. The rearward ends of the control rods 31 are pivotally connected to axle seats 33 so that control rods 31 are in an inclined orientation as shown in FIG. 4. The ideal orientation of lower control rods 31 is such that their rearward ends travel through arcs that, if extended, would pass through a horizontal line running through connection point 34 and perpendicular to side frame member 27. This orientation minimizes the effect that the suspension has on drive axle pinion change during articulation. The pivotal connections are such that lower control rods 31 pivot in a vertical plane parallel to side frame members 27.

As FIG. 4 shows, axle 25 is attached to axle seats 33 by means of axle attachment assemblies indicated generally at 35. The assemblies 35 comprise bolts 37 which fit through top plates 39 and axle seats 33. Axle 25 is sandwiched between top plates 39 and axle seats 33. Axle 25 passes between bolts 37. Lock nuts 41 hold the assemblies together. This attachment is more robust than the ones illustrated in the prior art because the bolts 37 are parallel and closer to the vertical walls of the drive axle thus providing a more secure axle clamp. Another advantage of assemblies 35 are that the bolts 37 are of the same length despite the pinion angle.

On each side of the suspension 21 an air spring 43 of known type is bolted at its base 45 to axle seat 33. The top of the air spring 43 is attached to the adjacent side frame member 27 by air spring bracket 47. The bottom of shock absorber 49 is pivotally mounted to axle seat 33. The top of shock absorber 49 is pivotally connected to side frame member 27 by shock absorber bracket 51.

Figure 3:
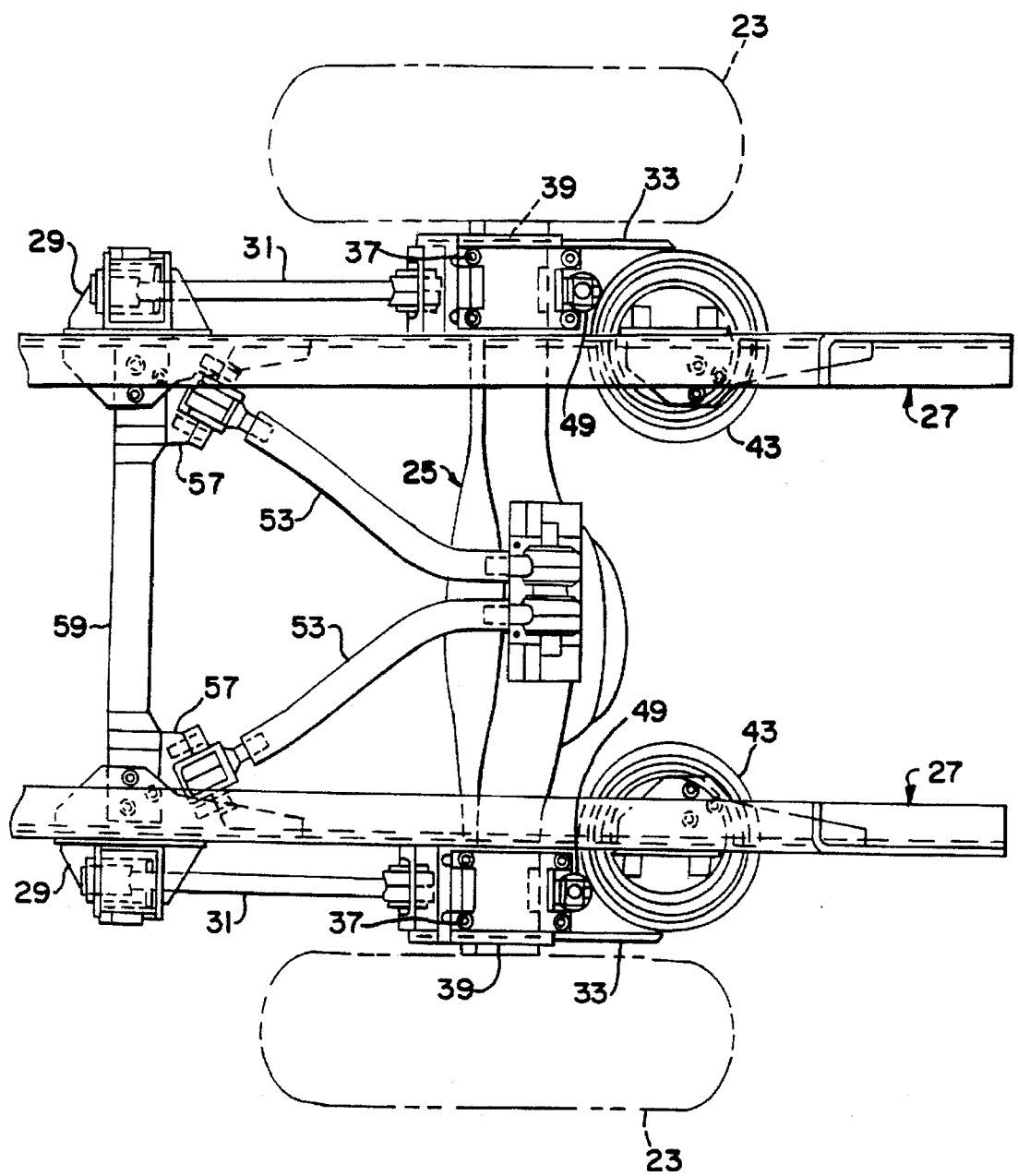
FIG. 3 is a top plan view of the suspension of FIG. 2.

Upper control rods 53 are each pivotally connected at their rearward ends to the center of axle 25 by axle mount 55 so that each upper control rod 53 moves independently of the other. Each upper control rod moves in its own vertical plane, each vertical plane making an angle with side frame members 27. The forward ends of upper control rods 53 are each attached to brackets 57. Brackets 57 are fastened to the inner sides of side frame members 27 and are supported in part by frame cross member 59 as shown in FIGS. 2 and 3.

Referring now to FIG. 4, generally horizontal line d—d is drawn extending longitudinally through the pivot centers 60 of upper control rods 53. Similarly, line e—e is drawn extending longitudinally through lower control rods 31. Lines d—d and e—e intersect at effective pivot point 61. Effective pivot point 61 is analogous to pivot point 13 of FIG. 1. Unlike the suspension in FIG. 1, the suspension in FIG. 4 has no contiguous Z-spring from the effective pivot point 61 to the axle 25 or air spring 43. Similar to FIG. 1, vertical line f—f passes through effective pivot point 61 while vertical lines g—g and h—h pass through axle 25 and air spring 43 respectively. Distances A and B can then be used to calculate the linkage ratio.

A comparison between lengths A and B of FIG. 1 and lengths A and B of FIG. 4 show that the latter are significantly longer. This is especially true when one considers that FIG. 4 is drawn to smaller scale than FIG. 1. The greater length of A and B allows the linkage ratio of the suspension of FIG. 4 to more closely approximate a value of 1.0. Referring to the suspension frequency equation above, this allows a lower frequency to be achieved for the suspension of FIG. 4 than for the suspension of FIG. 1. This results in a smoother ride and less vibration for the suspension of FIG. 4.

The inclination of the lower control rod 31, as shown in FIG. 4, offers numerous advantages over one that is positioned horizontally. For example, it has been found that an inclined orientation induces less load in the lower control rod 31. This allows for a lighter lower control rod 31 to be used which also saves material cost. Additionally, less expensive bushings, due to the lower loads, may be used at the lower control rod pivotal connections with the hanger 29 and the axle seat 33. Furthermore, the use of a horizontally oriented lower control rod requires the use of a longer hanger 29 which again increases weight and material cost. Finally, the longer hanger and horizontal lower control rod would take up more undercarriage space and reduce ground clearance. The latter would restrict the height of a road surface bump that the suspension could successfully negotiate.

Figure 5:
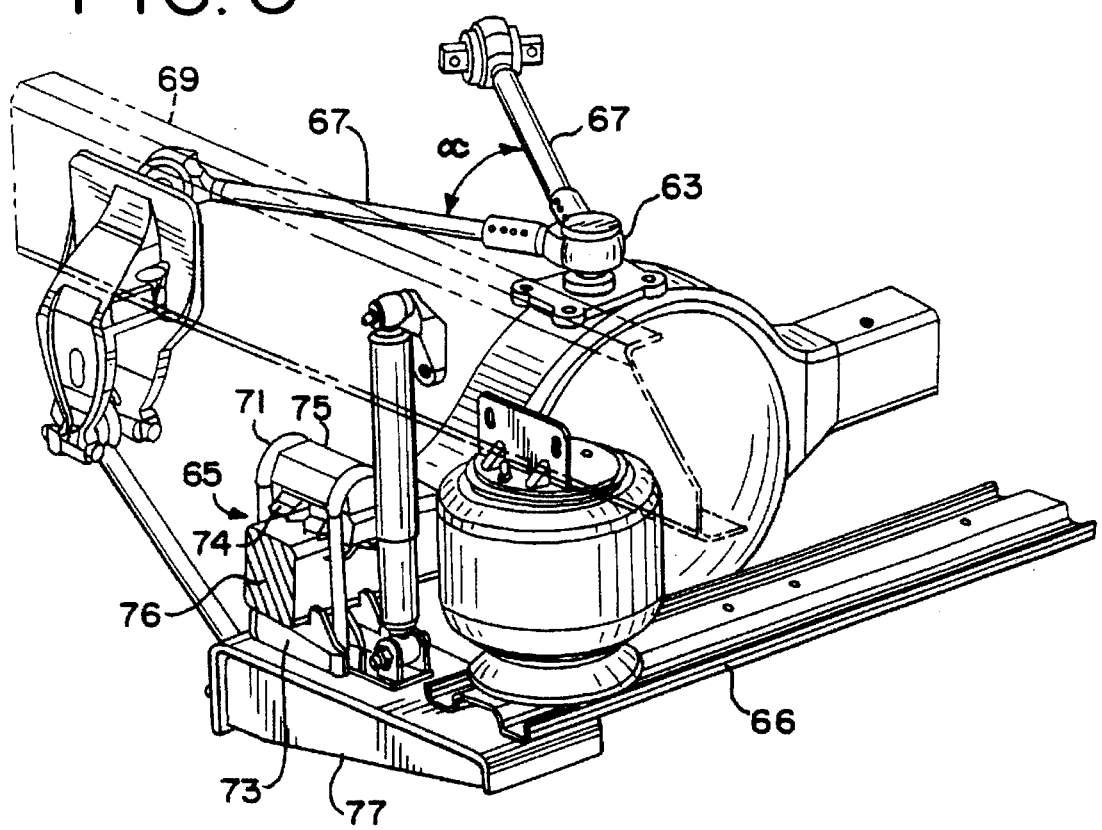
FIG. 5 is an isometric view of an embodiment of the suspension of the present invention utilizing air springs, a ball and socket upper axle mount and a cross channel.

Referring now to FIG. 5, one side of an alternative embodiment of the suspension of the invention is shown. This embodiment substitutes a ball and socket axle mount 63 for the bolt and bushing axle mount 55 of FIG. 2. Also, a different axle mount assembly, indicated generally at 65 is utilized in the embodiment of FIG. 5 as is a cross channel 66. Note that either the ball and socket mount 63, the axle mount assembly 65 or the cross channel 66 of FIG. 5 may be used independent of one another in other embodiments of the invention.

The rearward ends of upper control rods 67 of FIG. 5 enter ball and socket axle mount 63 at a fixed angle $\alpha$ with respect to one another so that upper control arms 67 may not move independently of one another. The forward ends of the upper control rods 67 are attached to side frame members 69, only one of which is shown in FIG. 5, in the same manner as illustrated in FIG. 2.

Figure 6:
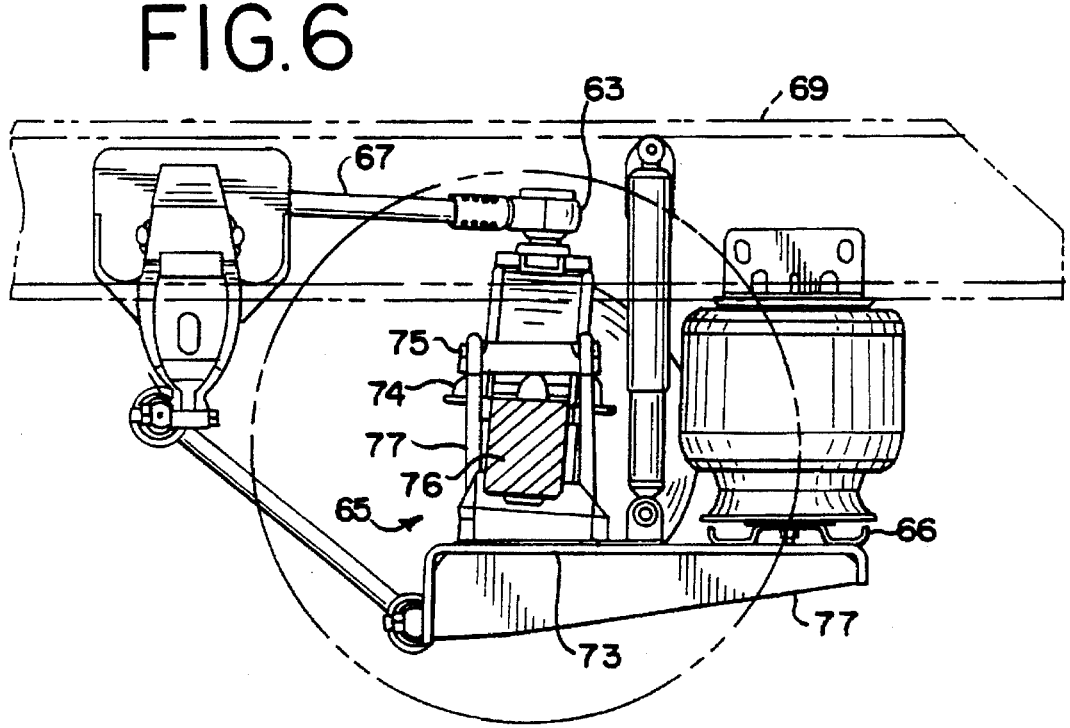
FIG. 6 is a side elevational view of the suspension of FIG. 5.

Axle mount assembly 65 comprises the usual inverted U or shackle bolts 71, bottom spacer seat 73, top spacer seat 74 and spacer block 75. Lock nuts, not shown, are attached to the threaded ends of U bolts 71 and hold the assembly, including axle 76, to axle seat 77. A side elevational view of the embodiment of FIG. 5 is shown in FIG. 6.

Figure 7:
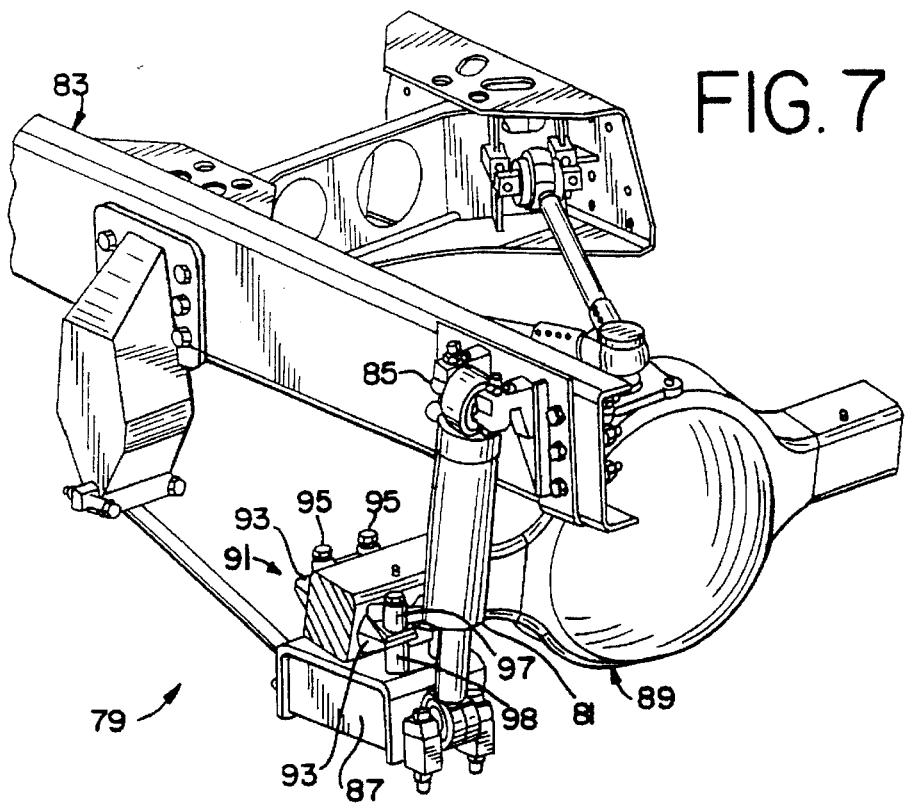
FIG. 7 is an isometric view of an embodiment of the suspension of the present invention utilizing hydraulic cylinders.
Figure 8:
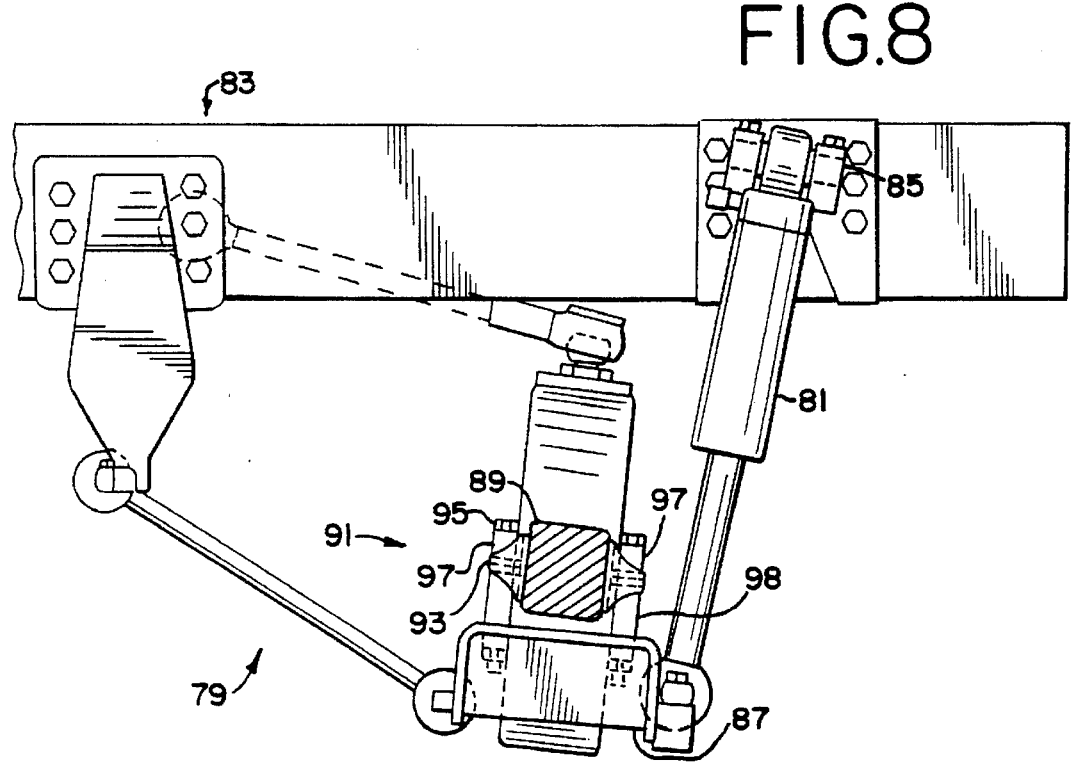
FIG. 8 is a side elevational view of the suspension of FIG. 7.

Referring now to FIG. 7, one side of another embodiment of the present invention is indicated generally at 79. This embodiment utilizes hydraulic cylinders 81, with accumulators, in place of the air springs and shock absorbers of the previous embodiments. As FIG. 7 shows, the top of hydraulic cylinder 81 is pivotally connected to side frame member 83 by hydraulic cylinder bracket 85. Hydraulic cylinder bracket 85 allows hydraulic cylinder 81 to pivot in a vertical plane perpendicular to side frame member 83. The bottom of hydraulic cylinder 81 is pivotally connected to axle seat 87 so that hydraulic cylinder 81 is able to also pivot in a vertical plane parallel to side frame member 83.

Axle seat 87 is fastened to axle 89 by the axle assembly indicated generally at 91. Bifurcated plates 93 are welded to the leading and trailing faces of axle 89. Bolts 95 fit through spacers 97, bifurcated plates 93, spacer seat 98 and axle seat 87. Lock nuts, not shown, attach to the threaded ends of bolts 95 so as to anchor the dog bone tabs 93, and thus axle 89 to axle seat 87. Note that the hydraulic cylinders 81, with accumulators, may be substituted for the air springs in any of the foregoing embodiments. Similarly, the axle mount assembly 91 may also be substituted for the axle mount assembly in any embodiment previously shown.

Figure 9:
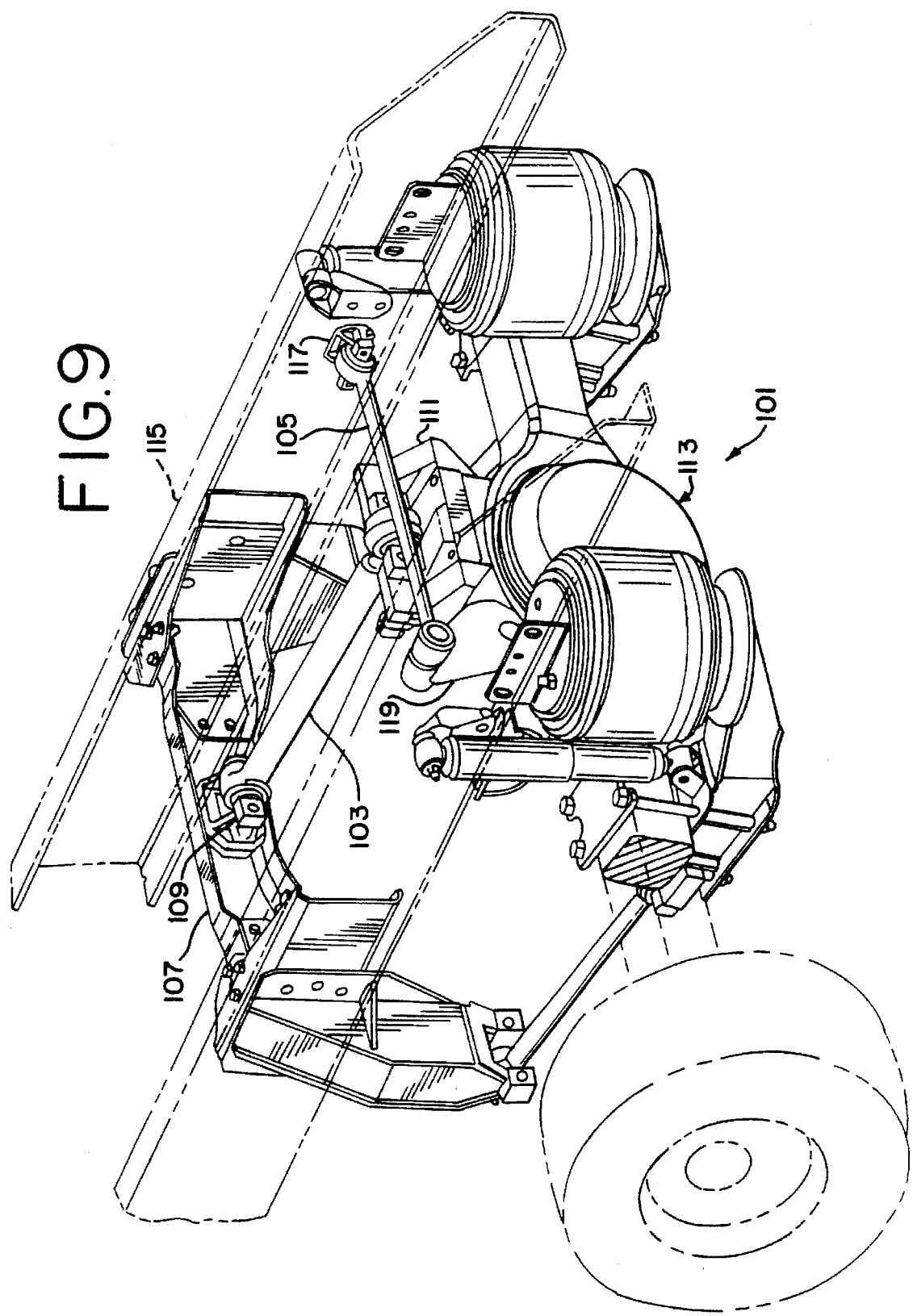
FIG. 9 is an isometric view of an embodiment of the invention where the upper control rods in the suspension of FIG. 2 have been replaced with a longitudinal upper control rod and a transverse upper control rod.

Referring now to FIG. 9, another embodiment of the suspension of the present invention is indicated generally at 101. This embodiment utilizes a longitudinal upper control rod 103 and a transverse upper control rod 105 in place of the V-rod configuration of the upper control rods of the previous embodiments. As FIG. 9 shows, the leading end of longitudinal upper control rod 103 is pivotally connected to frame cross member 107 by upper leading bracket 109. The trailing end of longitudinal upper control rod 103 is pivotally connected to axle mount 111 attached to axle 113. Upper leading bracket 109 and axle mount 111 allow longitudinal upper control rod 103 to lay in an approximately horizontal plane and to pivot in a vertical plane perpendicular to frame cross member 107.

Transverse upper control rod 105 is pivotally connected at its outer end to side frame member 115 by frame side bracket 117. The opposite end of the transverse upper control rod 105 is pivotally connected to transverse axle bracket 119. Transverse axle bracket 119 is attached to axle 113. Side frame bracket 117 and transverse axle bracket 119 allow transverse upper control rod 105 to lay in an approximately horizontal plane and to pivot in a vertical plane parallel to frame cross member 107.

Figure 10:
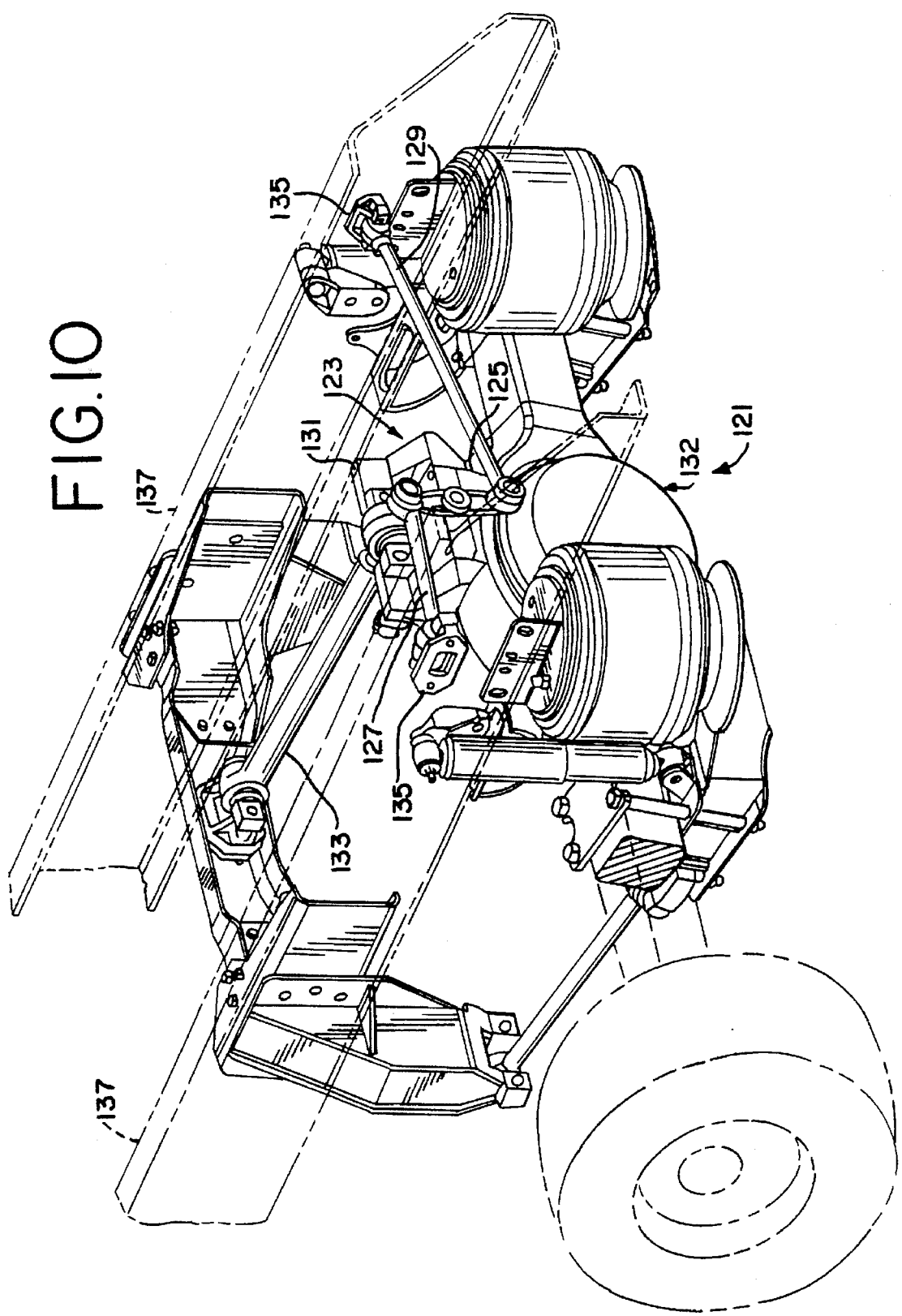
FIG. 10 is an isometric view of an embodiment of the invention where the upper control rods in the suspension of FIG. 2 have been replaced with a longitudinal upper control rod and a transverse Watt linkage.

In FIG. 10, an alternative embodiment of the suspension of the FIG. 9 is indicated generally at 121. In this embodiment, the transverse upper control rod 103 of FIG. 9 is replaced by a transverse Watt linkage, indicated generally at 123 in FIG. 10. The transverse Watt linkage is composed of Watt link 125, upper link arm 127 and lower link arm 129. Watt link 125 is pivotally connected at its center to axle combination bracket 131. Axle combination bracket 131, which is attached to axle 132, is also pivotally connected to the trailing end of longitudinal upper control rod 133.

The outward ends of lower link arm 129 and upper link arm 127 are pivotally connected to frame side brackets 135, which are secured to side frame members 137. Lower link arm 129 is pivotally connected at its inward end to the bottom end of Watt link 125, while the inward end of upper link arm 127 is similarly connected to the top end of Watt link 125. During articulation of the suspension 121, such as when the vehicle negotiates a bump or a curve, the components of transverse Watt linkage all move in a vertical plane perpendicular to side frame members 137. Furthermore, during articulation, Watt link 125 remains in its initial, nearly vertical, orientation.

Having described the invention generally and in detail in connection with the drawings, including presently preferred embodiments thereof, those skilled in the art will be able to practice the invention either according to the embodiments disclosed or according to other embodiments without departing from the spirit and scope of the appended claims.

What is claimed is:

1. A suspension system for supporting a vehicle chassis on an axle, comprising on each side of the vehicle:
   a) a hanger attached to a fore-and-aft extending chassis side frame member;
   b) an axle seat;
   c) means for attaching the axle seat to the axle;
   d) a lower control rod having a forward end pivotally connected to said hanger and a rearward end pivotally connected to said axle seat so that said lower control rod is inclined with its forward end above its rearward end;
   e) a bracket attached to said side frame member;
   f) an axle mount attached to the top of said axle midway between the ends of the axle;
   g) an upper control rod having a forward end pivotally connected to said bracket and a rearward end pivotally connected to said axle mount so as to lay in an approximately horizontal plane whereby said lower control rod and said upper control rod, while vertically spaced apart, are vertically appreciably closer at their forward ends than at their rearward ends; and
   h) spring means mounted between the axle seat and the chassis.

2. The suspension system of claim 1 wherein said upper control rod is attached to said axle joint with a bolt and bushing assembly.

3. The suspension of claim 1 wherein said upper control rod is attached to said axle joint with a ball and socket assembly.

4. The suspension of claim 1 wherein said spring means is an air spring.

5. The suspension of claim 1 wherein said spring means is a hydraulic cylinder with an accumulator.

6. The suspension of claim 1 wherein said spring means is a mechanical spring.

7. The suspension of claim 1 wherein said spring means is a elastomeric spring.

8. The suspension of claim 1 wherein said spring means is a combination of pneumatic, hydraulic, elastomeric and/or mechanical springs.

9. The suspension of claim 1 wherein said axle seat has a platform with an air spring and a shock absorber mounted between the platform and the chassis and behind the axle.

10. The suspension of claim 1 wherein said axle has an axle housing having four walls so as to form a square cross section and said means for attaching the axle seat to the axle is comprised of bolts that lie parallel to two opposing walls of said drive axle housing.

11. The suspension of claim 1 wherein said rearward end of said lower control rod travels through an arc that, when extended, passes through a horizontal line where the horizontal line runs through the connection of said rearward end of said upper control rod to said axle and perpendicular to said side frame member.

12. The suspension of claim 1 wherein said upper control rods from each side of the vehicle meet at said axle mount so as to form a "V".

13. The suspension of claim 1 wherein said axle seat is a spring member.

14. The suspension of claim 1 wherein said axle seat is a cast or forged member.

15. A suspension system for supporting a vehicle chassis on an axle, where the chassis has two parallel fore-and-aft extending chassis side frame members and a frame cross member, comprising:
   a) a first hanger and a second hanger, the first hanger attached to one of the side frame members and the second hanger attached to the parallel side frame member;
   b) a first axle seat and a second axle seat;
   c) means for attaching the first axle seat to one end of the axle and the second axle seat to the opposing end of the axle;
   d) Two lower control rods, each having a forward end pivotally connected to one of the hangers and a rearward end pivotally connected to one of the axle seats on the same side of the vehicle so that each lower control rod is inclined with its forward end above its rearward end;
   e) an upper leading bracket attached midway between the ends of the frame cross member;
   f) an axle mount attached to the top of said axle midway between the ends of the axle;
   g) a longitudinal upper control rod having a forward end pivotally connected to said upper leading bracket and a rearward end pivotally connected to said axle mount so as to lay in an approximately horizontal plane whereby said lower control rods and said longitudinal upper control rod, while vertically spaced apart, are vertically appreciably closer at their forward ends than at their rearward ends;
   h) means for stabilizing the axle in a direction transverse to the side frame members; and
   i) spring means mounted between the axle seat and the chassis.

16. The suspension of claim 15 wherein the means for stabilizing the axle in a direction transverse to the side frame members comprises:
   a) a frame side bracket connected to one of the side frame members;
   b) a transverse axle bracket attached to the axle; and
   c) a transverse upper control rod pivotally connected at its outer end to said frame side bracket and pivotally connected at its inner end to said transverse axle bracket.

17. The suspension of claim 15 wherein the means for stabilizing the axle in a direction transverse to the side frame members comprises:
   a) a first frame side bracket and a second frame side bracket, the first frame side bracket connected to one of the side frame members and the second frame side bracket connected to the parallel side frame member;
   b) a Watt link having a first end and a second end rotatably mounted at its center to the axle mount;
   c) an upper link arm pivotally connected at its inner end to the first end of the Watt link and at its outer end to the first frame side bracket; and
   d) a lower link arm pivotally connected at its inner end to the second end of the Watt link and at its outer end to the second frame side bracket;

whereby said Watt link maintains its original orientation during articulation of the suspension.

* * * * *